United States Patent [19]

Warshawsky

[11] Patent Number: 4,880,193

[45] Date of Patent: Nov. 14, 1989

[54] LESS THAN 360 DEGREE LAMP SWIVEL

[76] Inventor: Jerome Warshawsky, 1322 Everitt Pl., Hewlett Harbor, N.Y. 11557

[21] Appl. No.: 83,012

[22] Filed: Aug. 5, 1987

Related U.S. Application Data

[63] Continuation of Ser. No. 930,986, Nov. 14, 1986, abandoned, which is a continuation of Ser. No. 735,526, May 20, 1985, abandoned.

[51] Int. Cl.[4] .................................................. F16L 3/00

[52] U.S. Cl. .................................... 248/122; 248/145; 248/282; 248/415; 362/427; 362/431; 362/432; 403/164

[58] Field of Search ............... 248/122, 145, 415, 418, 248/274, 284, 291, 324; 403/164, 165, 178; 362/427, 431, 432

[56] References Cited

U.S. PATENT DOCUMENTS

| | | | |
|---|---|---|---|
| 3,010,013 | 11/1961 | Gunther et al. | 248/324 X |
| 3,044,798 | 7/1962 | Gerner | 403/164 X |
| 4,247,886 | 1/1981 | Warshawsky | 362/427 |
| 4,347,557 | 8/1982 | Warshawsky | 403/164 X |
| 4,381,538 | 4/1983 | Warshawsky | 362/431 X |
| 4,517,632 | 5/1985 | Roos | 362/427 X |
| 4,548,373 | 10/1985 | Komura | 248/122 |
| 4,726,552 | 2/1988 | Warshawsky | 248/415 X |

*Primary Examiner*—Ramon O. Ramirez
*Attorney, Agent, or Firm*—Stephen E. Feldman

[57] ABSTRACT

A swing arm lamp has the swing arms thereof connected to each other through a swivel assembly that includes a first swivel element and a second swivel element all disposed and interconnected so as to rotate with respect to each other about an axis of rotation through the swivel assembly, but so that relative sliding movement along the axis of rotation of the elements with respect to each other is substantially prevented and so that the relative rotation is limited to just about 360 degrees. The swivel elements are formed of tubular stock with one element having a reduced outer diameter at one end thereof, having a circumferential groove formed about such reduced outer diameter, and having a stop extending therefrom. The reduced outer diameter end portion of the one swivel element, in turn, seats in an enlarged inner diameter end portion of the other swivel elements. First and second lugs are formed from the material of such other swivel element by displacing the wall thereof in a swaging process.

The first such lug is so formed to project into the circumferential groove and coact with the side walls thereof, so as to permit the rotational movement and prevent the relative sliding movement. The second lug is formed to project into the path of rotation of the stop to prevent further rotation thereof and thus limit relative rotation of the swivel members to just under 360 degrees.

7 Claims, 3 Drawing Sheets

LESS THAN 360 DEGREE LAMP SWIVEL

This application is a continuation of application Ser. No. 930,986, filed Nov. 14, 1986, now abandoned, which is a continuation of application Ser. No. 735,526 May 20, 1985, now abandoned.

BACKGROUND OF THE INVENTION-FIELD OF APPLICATION

This invention relates to swivels; and more particularly, to swivels for lamps and the like which permit relative rotation of connected elements but prevent rotation thereof through 360 degrees.

BACKGROUND OF THE INVENTION-DESCRIPTION OF THE PRIOR ART

Some available lamps, or lighting devices, mount a bulb on a fixed base or support post. Although relatively simple in construction such a lamp requires the user to physically move the lamp if they desire to illuminate a particular location. Such is not always possible or desirable.

Some lamps incorporate one or more swing arms. One end of the swing arm is usually supported by or mounted to a support post; while the other end of the swing arm supports or carries the lighting elements of the lamp (i.e. the bulb socket, bulb, shade etc.). These swing arm lamps often utilize swivels, or swivel assemblies, to mount the swing arm to the support member and thus enable the swing arm and lighting elements carried thereby to be swung about an axis of rotation through the support member. Thus, a greater versatility is provided by such a lamp since the lighting elements can be selectively positioned to illuminate any one of many desired locations.

Many of such swing arm lamps connect the swing arm to its support member by a swivel; while others utilize a pair of swing arms connected one to the other by a swivel or swivel assembly. It is also possible in such swing arm lamps to not only connect the swing arms to each other by a swivel but also to connect a swing arm to its support member by a swivel. In such swing arm lamps even greater versatility is provided for selective positioning of the illuminating members of the lamp in that the swing arms can be selectively positioned with respect to the support post and with respect to each other.

Many swivels, or swivel assemblies, are relatively complex in construction and accordingly in cost thus adding undesirably to the cost of the lamp. Other swivel assemblies utilize a pair of swivel members connected together so as to facilitate relative swivelling movement between the members. However, if such swivel members are not secured to each other so as to prevent separation thereof then it is possible that they may separate and elements of the lamp may be damaged. In addition, if the swivel assembly permits a full 360 degree rotation of the swivel members, then lamp wiring passing therethrough may become twisted and break. This will not only render the lamp unusable but could result in electrical shock to the user.

Still other swivel assemblies may be interconnected to permit relative rotation, or swivelling action, about an axis of rotation through the swivel; but so as to prevent relative displacement of one swivel member with respect to the other along the axis of rotation. However, to provide such a connection by a headed screw which passes through one member and coacts with the other usually leaves an ugly and obtrusive screw head extending from the swivel assembly. In addition, an openiing must be formed through at least one swivel member for the headed screw and the opening must be tapped. The drilling of the opening and tapping of same are relatively expensive operations and add unwanted cost to the swivel assembly. Other swivels may eliminate the obtrusive screw head by utilizing a sunken hex screw but these still require the expense of drilling the opening and of forming screw threads therein. Here again, the failure to prevent more than 360 degrees of rotation in such swivel assemblies will permit twisting and breakage of the electrical wire with ensuing inability to use the lamp and possible electric shock.

SUMMARY OF THE INVENTION

It is therefore an object of this invention to provide a new and improved swivel assembly.

It is another object of this invention to provide a new and improved swivel assembly for a lamp.

It is yet another object of this invention to provide a new and improved lamp swivel assembly which restricts rotation of the swivel members to less than 360 degrees.

It is still another object of this invention to provide a new and improved swivel assembly for swing arm lamps.

It is yet still another object of this invention to provide a new and improved swivel assembly for interconnecting lamp swing arms to each other but so that rotation of the swing arms is restricted to just under 360 degrees.

It is yet still another object of this invention to provide a new and improved interconnection for the members of a lamp swivel assembly, which restricts rotation to just under 360 degrees.

It is a further object of this invention to provide a new and improved method and procedure for interconnecting the members of a lamp swivel assembly, and for preventing rotation of the members through a full 360 degrees.

This invention involves lamp swivel assemblies; and contemplates interconnecting the members of the swivel assembly together so as to permit relative rotation of one with respect to the other about an axis of rotation passing through the swivel assembly and so as to prevent relative movement of one swivel member with respect to the other along said axis of rotation; but which restricts such relative rotation to just under 360 degrees. The interconnection and restriction is provided by swaging operations which displace pieces of material of one swivel member into a grove formed in the other swivel member, and for coaction with a stop also formed on the other swivel member.

Other features and advantages of the invention in its details of construction and arrangement of parts will be seen from the above from the following description of the preferred embodiments when considered with the drawing and from the appended claims. In addition, these and other objects and advantages of the present invention will become evident from the description which follows:

DESCRIPTION OF THE PREFERRED EMBODIMENTS

For convenience, the invention will be described as applied to a lamp wherein a light source is carried at one end of a first tubular swing arm. The other end of the swing arm is connected by a swivel assembly to a first end of a second tubular swing arm. The other end of the second swing arm is, in turn, mounted to a swivel assembly carried at the top of a lamp support post the bottom of which is mounted to a base adapted to be placed upon a floor. The swing arms, swivels, support post and base are formed of brass. It should be understood, nevertheless, that: the single light source may be carried by a pair of swing arms mounted in parallel fashion to the swivel assembly; that other arrangements of light sources and swing arms are possible; that the swing arms, swivels, support post, and base may be formed from other metals, or from plastic, wood or other suitable materials or combinations thereof; and that the lamp support post may be sized to facilitate placement of the lamp upon a table desk, credenza, wall bracket, or the like.

Figure 1:
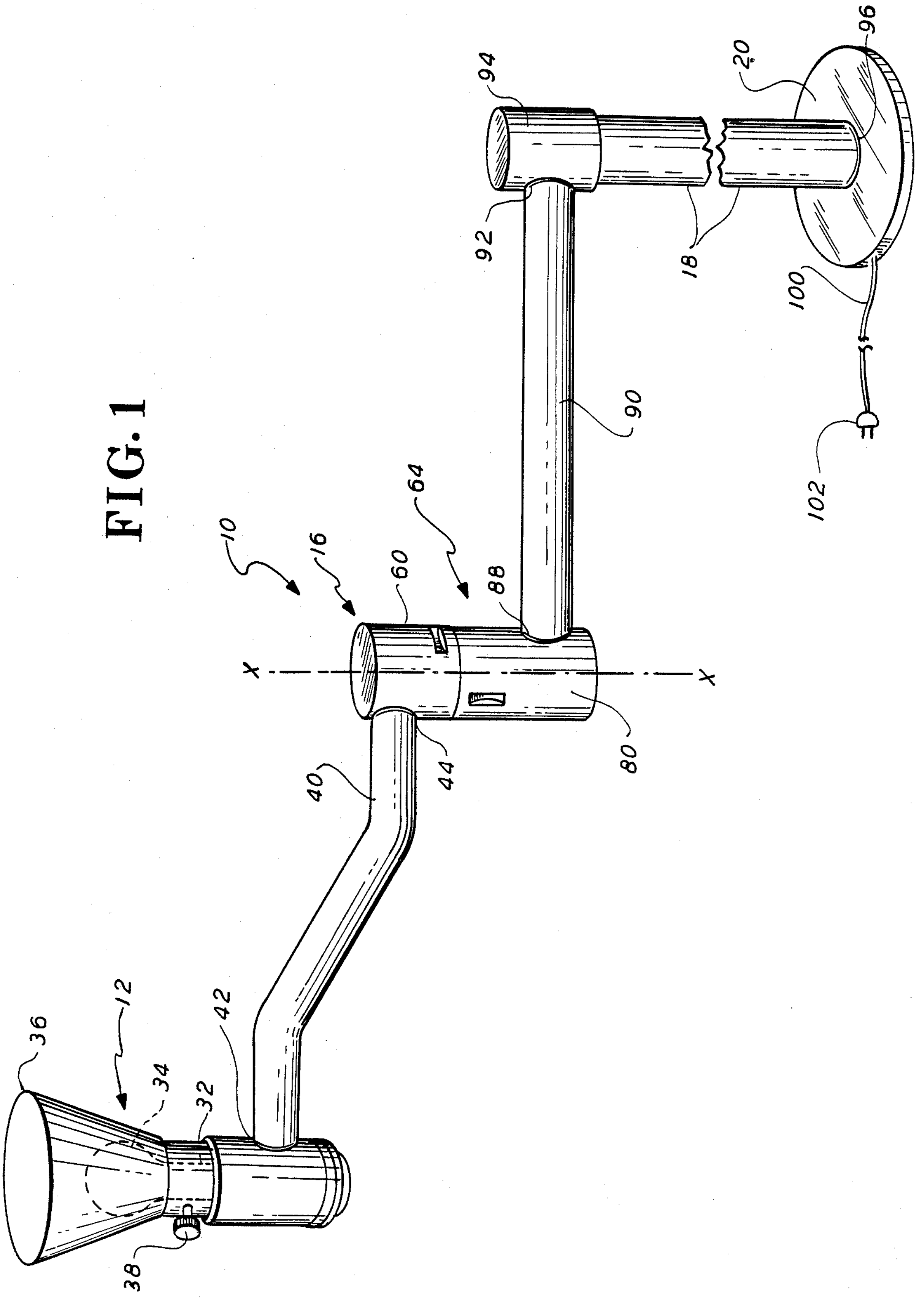
FIG. 1 is a perspective showing of a lamp incorporating the instant invention.

With reference to FIG. 1, there is generally shown at 10 a lamp incorporating a light source 12 carried by a swing arm assembly 16 that is, in turn, supported by a support post 18 which extends up from a base 20.

Support base 20 and support post 18 are formed from suitable metal such as brass, or which has been brass plated. Support post 18 extends up from base 20 a distance appropriate to support light source 12 from the floor. Support post 18 and base 20 may otherwise be sized to support light source 12 off a table, desk or the like.

Light source 12 incorporates a conventionally available bulb socket 32 which receives a bulb 34 and mounts a conical shade 36. A thumb switch 38 is provided for socket 32 to facilitate turning bulb 34 on and off. Shade 36 may be of any convenient configuration and disposed with bulb 34 and socket 32, to face up (as shown) down, out or in any desired direction. If desired, socket 32 may be mounted to a swivel which is in turn carried by swing arm assembly 16 so that light source 12 may be disposed in any one of many selected positions.

Bulb socket 32 is connected to a swing arm 40 of swing arm assembly 16, at end 42 thereof. The connection is accomplished by forming socket 32 with an internally threaded opening and by forming end 42 of arm 40 with external threads, and thereafter threading socket 32 onto end 42 of arm 40. Other suitable connecting means may also be utilized to connect socket 32 to arm 40.

Figure 2:
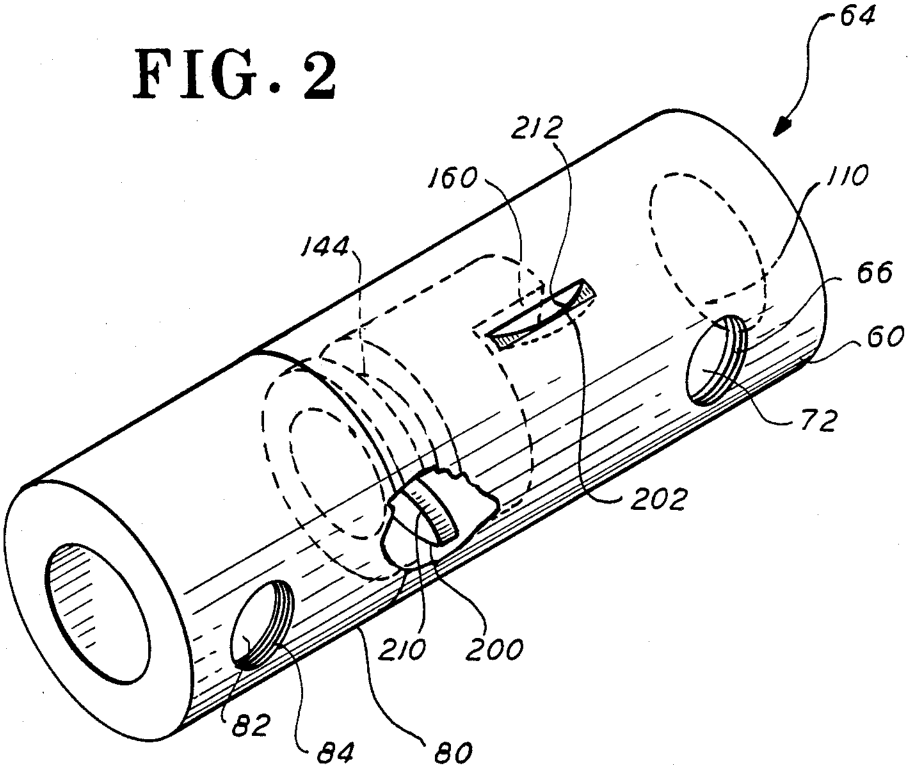
FIG. 2 is an enlarged isometric view of the swivel assembly of the lamp of FIG. 1 with parts cut away to better show details thereof.

The other end 44 of swing arm 40 is similarly connected to first element 60 of a swivel assembly 64 (i.e. end 44 of arm 40 is formed with external threads that are mated with internal threads 66 [FIG. 2] of an opening 72 formed in element 60 of swivel assembly 64). A second element 80 is interconnected to first element 60 as will be hereinafter explained, and forms therewith swivel assembly 64. An opening 82 (FIG. 2) is formed through second element 80 and has threads 84 formed therein to receive external threads formed at end 88 of a swing arm 90 the other end 92 of which is threaded into a swivel 94 carried on top of post 18.

Support post 18 is formed from tubular stock and of a suitable material such as brass, steel, aluminum or the like. Post 18 is of circular cross-section but may be of any other convenient cross-section; and may also be formed from solid bar stock where suitable. An appropriate finish may be applied to the outer surface of post 18. The lower end 96 of post 18 is secured by suitable means to base 20 which is fabricated from a suitable material compatible with that of support post 18.

Swing arms 40 and 90 are also formed of tubular stock of circular cross-section, and of a material corresponding to the material used for support post 18. An electrical conductor 100 of suitable material extends from base 20 through suitable channels in post 18, arm 90, swivel assembly 64, and arm 40 to be connected to bulb socket 32 and switch 38 thereof. A suitable male plug 102 is provided at the end of conductor 100 to facilitate connection of lamp 10 to an appropriate source of electricity.

First swivel element 60 is connected to second swivel element 80 so as to permit rotation thereof about a vertical axis of rotation X—X (FIG. 1) extending through swivel assembly 64. It should be recognized that axis of rotation X—X may extend in any direction depending upon the disposition of swivel assembly 64.

Figure 3:
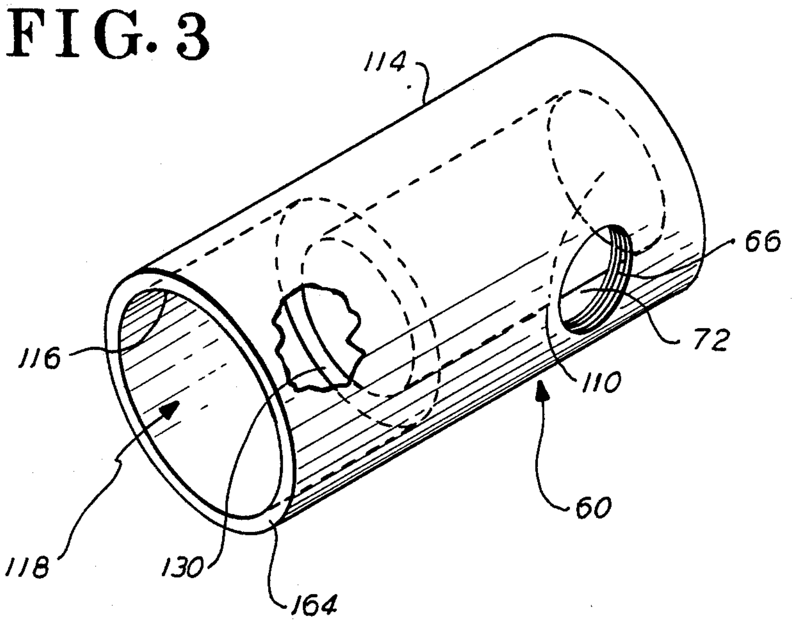
FIG. 3 is an isometric view of one member of the swivel assembly of FIG. 2.

First swivel element 60 is formed of tubular stock with opening 72 and with threads 66 formed therein. A center opening 110 (FIG. 3) extends through element 60 with a wall 114 thereof having a uniform thickness for a first portion of the lengths thereof and being of reduced thickness and enlarged diameter at 118 for the remainder thereof to provide a swivel seat 130. The outer diameter of swivel element 60 is formed identical to the outer diameter of swivel element 80.

Figure 4:
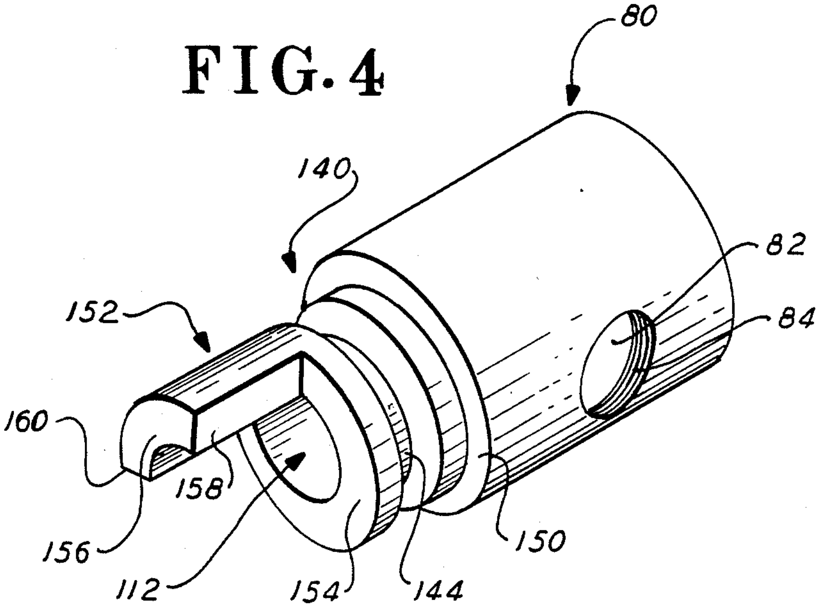
FIG. 4 is an isometric view of the other member of the swivel assembly of FIG. 2.

An end portion 140 (FIG. 4) of swivel element 80 is formed of reduced diameter and with a groove 144 circumferentially formed thereabout. The reduced diameter of end portion 140 provides a shoulder 150 on swivel element 80. Also formed on end portion 140 of swivel element 80 is a stop 152 which extends out from an end face 154 thereof. Stop 152 includes an end face 156 and side walls 158, 160.

End portion 140 is of diameter to facilitate insertion thereof into enlarged portion 118 of swivel element 60 with a sliding fit. The length of end portion 140 including stop 152 corresponds to the length of enlarged portion 118 of swivel element 60 so that end face 156 of end portion 140 butts up agaist swivel seat 130 of element 60 and so that shoulder 150 of element 80 butts up against an end wall 164 of element 60.

Figure 5:
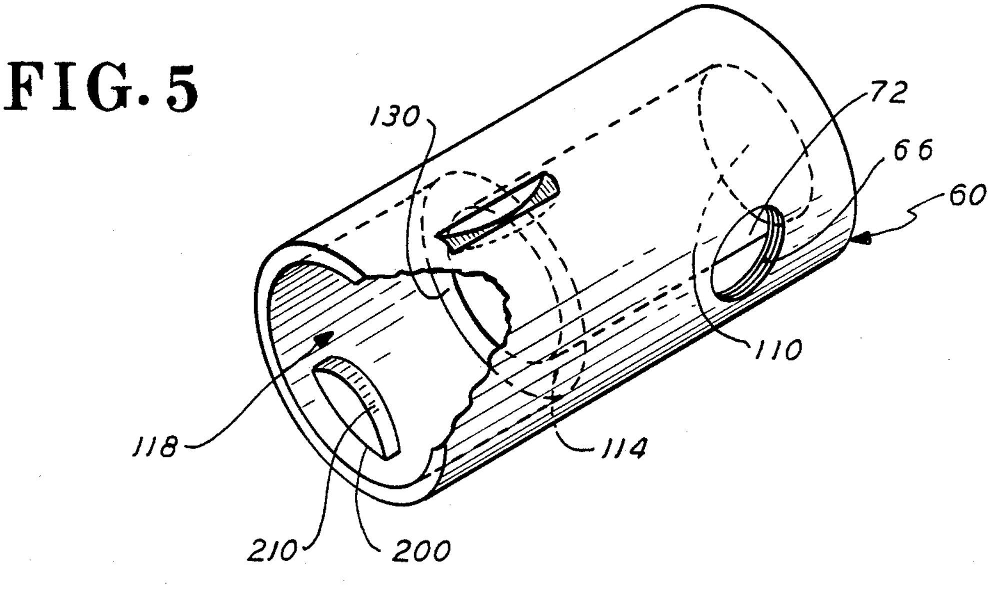
FIG. 5 is an isometric view of the member of the swivel assembly shown in FIG. 3 as it would appear if separate from the other member but after the two had been assembled together.

Swivel assembly 64 is assembled so that element 60 may rotate about axis of rotation X—X but so that element 60 may not slide along axis X—X and away from swivel element 80. This is accomplished as shown in FIGS. 2 and 5, by forming wages 200, 202 in swivel element 60 by conventional swaging process and tools. Each swage 200, 202 is formed by applying pressure to the material of swivel element 60 to displace such material so that a projecting lug like portion thereof 210, 212 extends into enlarged diameter portion 118. Projection or lug 210 is located and sized to extend into groove 144 of end 140 of swivel element 80, but so as to permit relative rotation between swivel element 60 and swivel element 80. The sides of lug 210 coact with the side walls of groove 144 to prevent sliding movement of swivel element 60 along axis X—X and away from swivel element 80 once so assembled.

Lug or projection 212 is located and sized to extend into enlarged diameter portion 118 of swivel element 60 in the area thereof in the path of movement of stop 152 when swivel elements 60 and 80 are rotating with respect to each other. As such, when either side wall 158 or side wall 160 of stop 152 (depending upon its direction of rotation) strikes a corresponding side wall of lug 212 no further rotation between swivel elements 60 and 80 can take place.

The manner in which wages 200 and 202, and corresponding projections 210, 212, are created is generally described as swaging. The swaging operations are performed after insertion of end portion 140 of swivel element 80 into enlarged diameter portion 118 of swivel element 60 and when accomplished creates swivel assembly 64.

A swage is normally accomplished by means of a conventionally available hydraulic, pneumatic or mechanical press, or the like. Special fixtures, tooling and/or holding devices may be employed to assure proper placement and location of swages 200, 202. The resulting displacement of the material of wall 114 of element 60 forms lugs 210, 212.

If desired, the swivel assembly may be formed with swivel element 80 constituting a center swivel element disposed between a pair of end swivel elements each formed and assembled thereto like swivel element 60. Thus, the center swivel element would have an end portion, similar to end portion 140, at each end thereof.

As various possible embodiments might be made of the above invention, and as various changes might be made in the embodiment above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby, since the embodiments of the invention particularly disclosed and described herein above are presented merely as an example of the invention, coming with the proper scope and spirit of the appended claims, will of course readily suggest themselves to those skilled in the art. Thus, while there has been described what is at present considered to be prefered embodiments of the invention, it will thus be obvious to those skilled in the art that various changes and modifications may be made therein, without departing from the invention, and it is therefore, aimed in the appended claims to cover all such changes and modifications as fall within the true spirit and scope of the invention, and it is understood that, although I have shown the preferred form of my invention, that various modifications may be made in the details thereof, without departing from the spirit as comprehended by the following claims.

What is claimed is:

1. A swivel assembly for a lamp comprising:

(a) a first tubular swivel means matable with a second tubular swivel means, said first swivel means and said second swivel means rotatable with respect to each other about a common axis, said first tubular swivel means including, (i) a first outer diameter portion, (ii) a second outer diameter portion extending from said first outer diameter portion, (iii) a third outer diameter portion defining a groove in said second outer diameter portion;

(b) said first outer diameter portion terminating in a first shoulder and stepping down to said second outer diameter portion, said second outer diameter portion being smooth walled and extending from said shoulder to a stop means, said second outer diameter portion interrupted by said third outer diameter defining a groove in said second diameter portion, said stop means defining a partial arcuate extension of said second outer diameter portion;

(c) said second tubular swivel means including, (i) a fourth outer diameter portion, the diameter of which corresponds to the diameter of said first outer diameter portion, (ii) a first inner diameter portion adapted to matably receive said second outer diameter portion and said third outer diameter portion and said stop means of said first tubular swivel means, said fourth outer diameter portion terminating in a second shoulder, said first inner diameter portion extending from said second shoulder and under said fourth outer diameter defining a reception cavity in said second tubular swivel means for receiving said second outer diameter portion and said third outer diameter portion and said stop means; and, (d) swage means located in said fourth outer diameter portion of said second tubular swivel means and positioned circumferentially for repositioning a circumferential portion of said fourth outer diameter portion and said first inner diameter portion to a first variable outer arcuate portion and a first variable inner arcuate portion, said first variable inner arcuate portion extending to a level between said second outer diameter portion and said third outer diameter portion for capturing and retaining said first tubular swivel means in mated condition in said second tubular swivel means and for preventing sliding separation of said first and second swivel means without interfering with the rotational relationship between said first tubular swivel means and said second tubular swivel means.

2. A swivel assembly for a lamp as in claim 1 and further including second swage means located in said fourth outer diameter portion of said second tubular swivel means positioned substantially at normal to a circumferential line about said second tubular swivel means for repositioning a portion of the surface of said fourth outer diameter portion and said first inner diameter portion to a second variable indented portion in said fourth outer diameter portion and a second variable extended portion in said first inner diameter portion for interfering with the rotational travel of said first tubular swivel means by interrupting the arcuate travel of said stop means.

3. A lamp stand for supporting a lamp socket means for receiving a light means, said lamp stand having a base means and a swivel assembly between said lamp socket means and said base means, said swivel assembly capable of rotating less than but approaching 360 degrees in rotation, said swivel assembly comprisng:

(a) a first swivel means including a first outer diameter portion terminating at a shoulder, a second outer diameter portion extending from said shoulder and terminating in a stop means defined by an arcuate extension of said second outer diameter portion, and, groove means in said second outer diameter portion between said shoulder and said stop means substantially reducing the diameter of said second outer diameter portion;

(b) a second swivel means including a fourth outer diameter portion, the diameter of said fourth outer diameter portion substantially equal to the diameter of said first outer diameter portion, said fourth outer diameter portion terminating at a second shoulder, and an inside diameter portion extending from said second shoulder defining a cavity in said second swivel means, said cavity for snuggly receiving said second outer diameter portion and said stop means of said first swivel means with said shoulder of said first swivel means abutting said second shoulder of said second swivel means, said first swivel means and said second swivel means in rotatable relationship with respect to each other, each rotatable about a common axis;

(c) lug means in said second swivel means extending into said cavity from said inside diameter portion and positioned to extend into said groove and below the surface of said second outer diameter portion for capturing and retaining said first swivel means in matable position in said inside diameter portion of said second swivel means for preventing sliding separation of said first and second swivel means; and (d) second lug means in said second swivel means extending into said cavity from said inside diameter portion and below the surface of said second outer diameter portion for interfering with the circumferential travel of said stop means of said first swivel means with respect to said second swivel means.

4. A lamp stand as in claim 3 and further including:

(a) hole means located in said first outer diameter portion of said first swivel means for receiving said base means; and, (b) second hole means located in said fourth outer diameter portion of said second swivel means for receiving said lamp socket means.

5. A lamp stand as in claim 3 and in which said lug means in said second swivel means is circumferentially oriented and substantially parallel with said groove into which said lug means extends.

6. A lamp stand as in claim 4 and in which said light means is electrical and said base means and said first swivel means and said second swivel means each have channels there through, with the channels interconnected for receiving an electric wire to be connected to said lamp socket means at one end and an electric supply at the other end.

7. A lamp stand for supportiing a lamp as in claim 3 and in which the said second outer diameter portion of said first swivel means has a smooth surface and the said inside diameter portion of said second swivel means has a smooth wall except for said lug means and said second lug means which extend into said cavity from said inside diameter portion.

* * * * *